FIG. 2

INVENTORS
ROBERT G. BURTON
JEFFERSON P. LAMB
BY  JURGEN R. SCHOPPER

ATTORNEY

United States Patent Office 3,103,626
Patented Sept. 10, 1963

3,103,626
FOCUS LOGGING SYSTEM WITH SUBSURFACE TRANSFORMER SAMPLING MEANS
Robert G. Burton, Jefferson P. Lamb, and Jurgen R. Schopper, Tulsa, Okla., assignors, by mesne assignments, to Dresser Industries, Inc., Dallas, Tex., a corporation of Delaware
Filed Jan. 12, 1960, Ser. No. 2,016
7 Claims. (Cl. 324—1)

This invention relates to electrical logging systems and more particularly to systems wherein the emanating current is focused to flow in a thin sheet transverse to the bore hole.

In so-called conventional electrical logging a potential field is established between an exploring current electrode within the electrolyte filled bore hole and a stationary remote current electrode which may either be at the surface of the ground or the metallic armor of the conductor cable. The passage of this current through formations results in equipotential zones which are effectively spheres when the adjacent formation is homogeneous. By locating voltage pickup electrodes in the bore hole at selected distances away from this exploring current electrode, the voltage of a particular spherical volume of formation is sampled, the objective being to measure voltage values which represent the resistivity of adjacent formations at some desired lateral or radial distance away from the bore hole. It is well recognized that the farther away from the exploring current electrode these voltage electrodes are spaced the greater the effective lateral investigation of the formation but also the greater the volume of formation sampled. This inevitable increase information volume with increase in lateral investigation results in greater and greater averaging of formations or, conversely, in less and less formation detail or vertical resolution. Early methods utilized a voltage measurement between a single voltage pickup electrode near the exploring current electrode and a remote ground. Such a measurement provided adequate formation detail for close spacings—up to approximately 20 inches—but resulted in too much formation averaging for longer spacings. Methods utilizing two closely spaced voltage pickup electrodes at greater distances from the current electrode resulted in reducing the sampled formation volume at the longer spacings but even these fail to provide the desired formation resolution and effective depth of lateral investigation.

In order to overcome these disadvantages, while still immunizing the resistivity readings from bore hole effects, there evolved the focus logging system or what is often called the guard electrode system. This particular improvement over earlier point electrode systems employs a short center or current emanating electrode disposed intermediate a pair of elongated guard electrodes. With a current field established between the center electrode and a remote ground, secondary fields are established between the guard electrodes and remote points. These focus or compress the center electrode field so that current flowing out of the center electrode follows a thin horizontal path into the formation.

These focus or guard log systems originated with a movable electrode system disclosed in Patent 2,266,071, issued to Raymond G. Piety on December 16, 1941. His system was further refined in his Patent 2,347,794 which issued May 2, 1944. Certain other refinements and original work directed broadly to focus or guard log systems was performed by Conrad Schlumberger at a time much earlier than the Piety disclosures. This work was referred to in an article by H. G. Doll entitled "The Laterolog—A New Resistivity Logging Method With Electrodes Using an Automatic Focusing System," published in Petroleum Transactions of the AIME, vol. 192 (1951). Beyond this, Patent 2,446,303, issued to J. E. Owen on August 3, 1948, discloses a guard log system. All of these disclosures relate more or less to the broad idea of employing a center electrode for establishing a current in the formations surrounding a bore hole and employing one or more electrodes to focus or compress the current emanating from the center electrode to a thin horizontal path. Changes in current and voltage caused by resistivity changes in the laterally displaced formations cut by the thin horizontal path are then detected to indirectly measure the resistivities.

In the focus logging apparatus disclosed by Schlumberger and in Owen Patent 2,446,303, a short center electrode is caused to establish a current field in the formation surrounding the bore hole and a pair of relatively long electrodes are disposed above and below the center electrode to act as guards or focusing devices. The two guards are directly connected together and the guard system and the center electrode are connected through a low value resistor whereby all three electrodes are substantially at the same potential. With this arrangement the current flowing in the center electrode and the voltage drop to ground are measured to provide a measure of resistivities of the formations in a direction laterally displaced from the center electrode as the electrode structure is caused to traverse the extent of the bore hole. The present invention constitutes an improvement over focus logging systems more or less similar to that of Owen, Schlumberger and Piety.

The instant invention employs a short main or center electrode of the order of a few inches in length interposed between a pair of elongated guard electrodes which may vary from 3 to 10 or more feet in length. The two guard electrodes are electrically connected together. An essentially constant voltage is established between all of these electrodes and the cable sheath, and the current flowing in the center electrode is detected, converted to a D.C. signal and transmitted to the surface over a pair of conductors to provide a direct measurement of the subsurface formations conductivity. Beyond this a sample voltage is obtained between the electrode assembly and a remote ground, converted to a D.C. signal and transmitted to the surface over another pair of conductors to control the voltage generator output such that the subsurface sample voltage between the electrode assembly and remote electrode remains essentially constant and independent of variations in subsurface resistivities, cable voltage drop, etc. Current and voltage signals at the surface are applied to a servo system which provides outputs to a recorder to record conductivities and resistivities of subsurface formations.

Conventional means cooperate with the subsurface electrode array to move it along the extent of the bore hole at a preselected logging speed to provide a continuous log of resistivities and conductivities of subsurface lithology defining the bore hole. A logging speed of approximately 100 feet per minute is usual. These values may be recorded by pen or photographic recorders of the kind commonly used with well logging systems.

While the broad outline of the present logging system is suggested by the prior art noted above, particular features of the present system provide substantial improvements in overall operation and performance. Therefore, broadly speaking, a principal object of the invention is to provide a focus logging system which is efficient to operate, economical to manufacture and requires minimal maintenance and supervision.

Other objects of the present invention are to provide a focus logging system employing a constant voltage source of logging current, D.-C. transmission of voltage and current signals to the surface equipment, and a simple reciprocating servo system for obtaining resistivity counterparts for the conductivity outputs.

A feature of the present invention pertains to a focus logging system wherein the source of voltage and the voltage and current pickup circuits are transformer coupled to the electrode configuration in the subsurface instrument.

Another feature of the invention pertains to means for converting the detected current and voltage signals to D.-C. equivalents for transmission to the surface equipment.

Yet another feature of the invention pertains to reducing leakage and conductor crosstalk by isolating the grounds of the constant voltage source and sample voltage signals.

Still other features of the present invention relate to the subsurface sampling of the voltage field to control the generator output, a linear potentiometer servo system for providing a stable readout of the resistivity values of subsurface formations adjacent the center electrode, and the combination of components in a focus logging system to attain the objects set forth above.

More particularly, a feature of the invention pertains to a focus logging system including the combination of a short center electrode, a pair of oppositely disposed elongated electrodes which act to focus current flowing from the center electrode, transformer means to connect the center and guard electrodes and to detect the current flowing from the center electrode, a voltage generator forming part of the surface equipment and transformer coupled to the subsurface electrode configuration, transformer means to sample the voltage between the electrodes and ground, subsurface means for converting current and voltage signals to direct current signals for transmission to the surface equipment, means responsive to the subsurface voltage signal to maintain the potential of the subsurface electrode array constant, a servo system, and means responsive to the current and voltage signals to cause the servo system to provide an output representative of the resistivity values of the subsurface lithology adjacent the center electrode.

These and other objects and features will be more fully understood when the following detailed description is read with reference to the drawings, in which.

*General Description*

Figure 1:
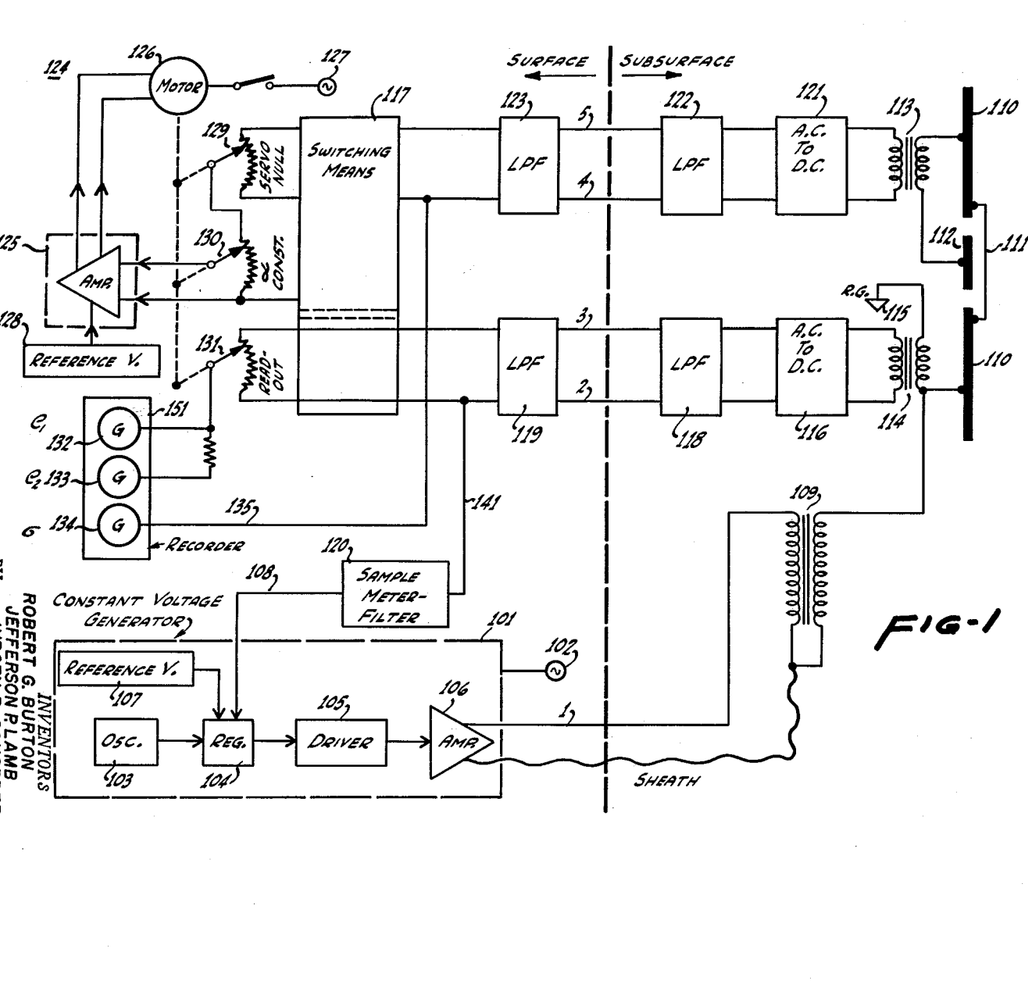
FIG. 1 is a schematic block diagram of the surface and subsurface components of the present focus logging system.

The schematic block diagram of FIG. 1 best illustrates the operation of the focus logging system constituting the present invention. Voltage generator 101 generates an A.C. voltage which is applied to conductor 1 and sheath ground. The generator 101 is supplied by a source of external power 102, e.g., 60 cycle, and includes an oscillator 103, a regulator 104, a driver section 105, an amplifier 106, and a reference voltage source 107. Within the controlled voltage generator 101 the oscillator 103 is caused to generate an A.C. voltage, for example a 400 cycle per second signal, which is supplied to the regulator 104 which acts as a variable conductance bridge, as will be explained in more detail below. The regulator 104 responds to voltages from the reference source 107 and from the subsurface electrode array, which is supplied to the regulator 104 via the lead 108 as will be explained below.

Depending upon the relative values of the sample voltage on lead 108 and the reference voltage 107, the regulator 104 varies the amplitude of the constant frequency output of oscillator 103 which is applied through the driver stage 105 and amplifier 106 to conductor 1 and sheath ground. The guards 110 are connected together by lead 111 and to the center electrode 112 through the low impedance primary of coupling transformer 113. As the subsurface instrument is caused to traverse the extent of the bore hole, the surface supplied voltage is sampled at one of the guards 110 by sampling transformer 114, the primary of which is connected between the elongated guard 110 and a remote ground 115, the latter being approximately 50 to 100 feet up the cable from the subsurface instrument. The secondary of the sampling transformer 114 is connected through an A.C. to D.C. converter 116 and low-pass filter 118 to conductors 2 and 3. The conductors are part of the six-conductor cable used with the present system to transmit current to the subsurface instrument and information signals to the surface equipment.

Intermediate the A.C.-D.C. converter 116 and switching means 117 located at the surface are low-pass filters 118 and 119. These low-pass filters act to substantially block all signals over 5 cycles per second or so. As a result, they attenuate harmonics and subharmonics of 60 cycle stray interference and 400 cycle power sources. From the output of the surface located low-pass filter 119 a sample or voltage signal is fed over lead 141 through a sample meter-filter circuit 120 and thence over lead 103 to the regulator 104 of the controlled voltage generator 101. The time constants of these filters do not limit the use of logging speeds upwards of 200 feet per minute, which are quite high for normal logging operations.

With the voltage establishing circuit over conductor 1 and sheath ground, transformer 109 and the electrodes 110 and 112 completed, the subsurface field is established. Thereafter, samples from transformer 114 are directed over conductors 2 and 3 ultimately to the regulator section 104 of the controlled voltage generator 101. Whenever the subsurface lithology changes in content to the extent that the electrode voltage tends to change, the voltage is detected by the voltage signal circuit (transformer 114, etc.) and directed to the regulator 104 which increases or decreases the voltage applied to conductor 1 and sheath ground for transmission to the subsurface electrode configuration. In this way the voltage field established by the center electrode 112 is maintained constant.

At the same time the voltage is being sampled at the transformer 114, a current signal is obtained across the secondary of transformer 113, the primary of which interconnects the guard and center electrodes 110 and 112, respectively. The primary of transformer 113 is of very low impedance of the order of a fraction of an ohm, so that the guard and center electrodes are at substantially the same potential, a condition precedent to effective focusing by the guard electrodes of the center established field. The output of transformer 113 is fed through an A.C.-D.C. converter 121, subsurface low-pass filter 122 (similar to filter 118 in the voltage signal circuit) and over conductors 4 and 5 to the surface equipment. At the surface, the current signal on conductors 4 and 5 is directed through another low-pass filter 123 to switching means 117.

Switching means 117 may or may not be manually operated to cut the focus logging system off, place it in an operating condition or provide the circuit arrangement for setting the zero and full-scale deflections of the servos. Cooperating with the switch means 117 is a servo system 124 which includes a differential amplifier 125, a motor 126, a source of alternating current 127, a reference potential source source 128, and three linear potentiometers 129, 130 and 131, all of which are driven by the shaft of motor 126. Linear potentiometers 129 and 130 act as servo nulling and constant gain controls for the servo system 124 and, in response to the current signals flowing through conductors 4 and 5, operate to provide a voltage read-out on linear potentiometer 131 when the servo system 124 reaches an equilibrium position. Cooperating with the wiper of linear potentiometer 131 are a pair of galvanometers 132 and 133 which register two scale values of the resistivity of the formation adjacent center electrode 112. Another galvanometer 134 is connected over lead 135 to the current signal channel to provide a direct reading of the conductivity of the formation adjacent the center electrode 112. All of these galvanometers form part of the recorder 151 which may include a conventional pen recorder or film transport to continuously and permanently retain the variations as a bore hole is logged.

As will be understood, by maintaining the field established by the center electrode 112 at a constant voltage, the reading of the current signal detected via transformer 113 in the subsurface equipment provides a direct reading of the conductivity of the formation. The servo system 124 cooperates to reciprocate the current signal value to provide the resistivity readings recorded on galvanometers 132 and 133. By utilizing a constant voltage focus log system, it is unnecessary to provide an additional servo system for taking the ratio of the varying voltage and current in order to obtain in one case the resistivity measurement and in the other case the conductivity measurement. Not only does the utilization of a constant voltage system obviate the need for two servo systems but by sampling the voltage adjacent the subsurface instrument to control the output of the voltage generator 101, it neutralizes the effects of cable drop, interconductor capacitance, cross talk and the like.

Turning to other features of the overall system, it can be seen that the advantage of converting the detected current and voltage signals, adjacent the subsurface instrument, to D.-C. signals overcomes the problem of current conductor interference, not to mention the capacitance and interconductor interference which results when alternating current and pickup signals are transmitted simultaneously in a multiconductor cable. Two other features which might be mentioned are: first, the employment of the primary of transformer 113 to place the guard and center electrodes 110 and 112, respectively, at substantially the same potential and at the same time by the use of the transformer's high impedance transformation to obtain substantial signal level with isolation and without electronic amplification; secondly, by separating the grounds for the source of constant voltage (sheath ground) and the voltage signal taken from transformer 114 (remote ground 115), the finite drop in impedance through the first 100 feet or so of the cable sheath is not combined with the sample voltage signal, which would result in an error in deriving the conductivity and resistivity values.

Briefly recapitulating the functional outline of the focus logging system of FIG. 1, it can be seen that the controlled voltage generator 101 places a constant voltage at the input to transformer 109. Transformer 109 has a high current ratio whereby the signal supplied to its primary is converted to a much higher current for application to the guard electrode structure 110—112. With the controlled voltage source supplying the guard 110 and the center electrode 112, the latter through the primary of the winding of transformer 113, the electrodes are at substantially equal potentials and the resistivity and conductivity of the formation adjacent the electrodes may be determined. The secondary of transformer 113 is connected through the A.C.-D.C. converter 121 where the signals are converted to D.-C. The converted signals then course filter 122, which removes any ripple, crosstalk, or stray A.C. pickup and also prevents portions of the current from being chopped by the converter 121 to increase the error signal. From the filter 122, the current signal is conveyed over conductors 4 and 5 to low-pass filter 123 of the surface equipment and from there to the switching means 117. There, in cooperation with a reference potential 128, it causes the servo system 124 to operate.

The servo system 124 also requires an input from the controlled voltage source sample which is obtained via transformer 114 in the subsurface equipment. The secondary of transformer 114 is connected through a rectifier or converter 116 which rectifies the A.C. to provide a D.-C. signal. This signal courses low-pass filter 118 (employed for substantially the same purpose as filter 122) and thence over conductors 2 and 3, through the surface low-pass filter 119 to the switching means 117. It, in cooperation with the rectified current signal, cooperates with the switching means 117 and the linear potentiometers 129, 130 and 131 to provide outputs at galvanometers 132 and 133 which record multiple scale resistivities. On the other hand, the conductivity is obtained directly from the rectified current signal flowing in conductors 4 and 5, because, since the voltage is maintained constant, the current signal is a direct measure of the formation conductivity. This signal is applied to the galvanometer 134 over lead 135 as indicated.

Figure 2:
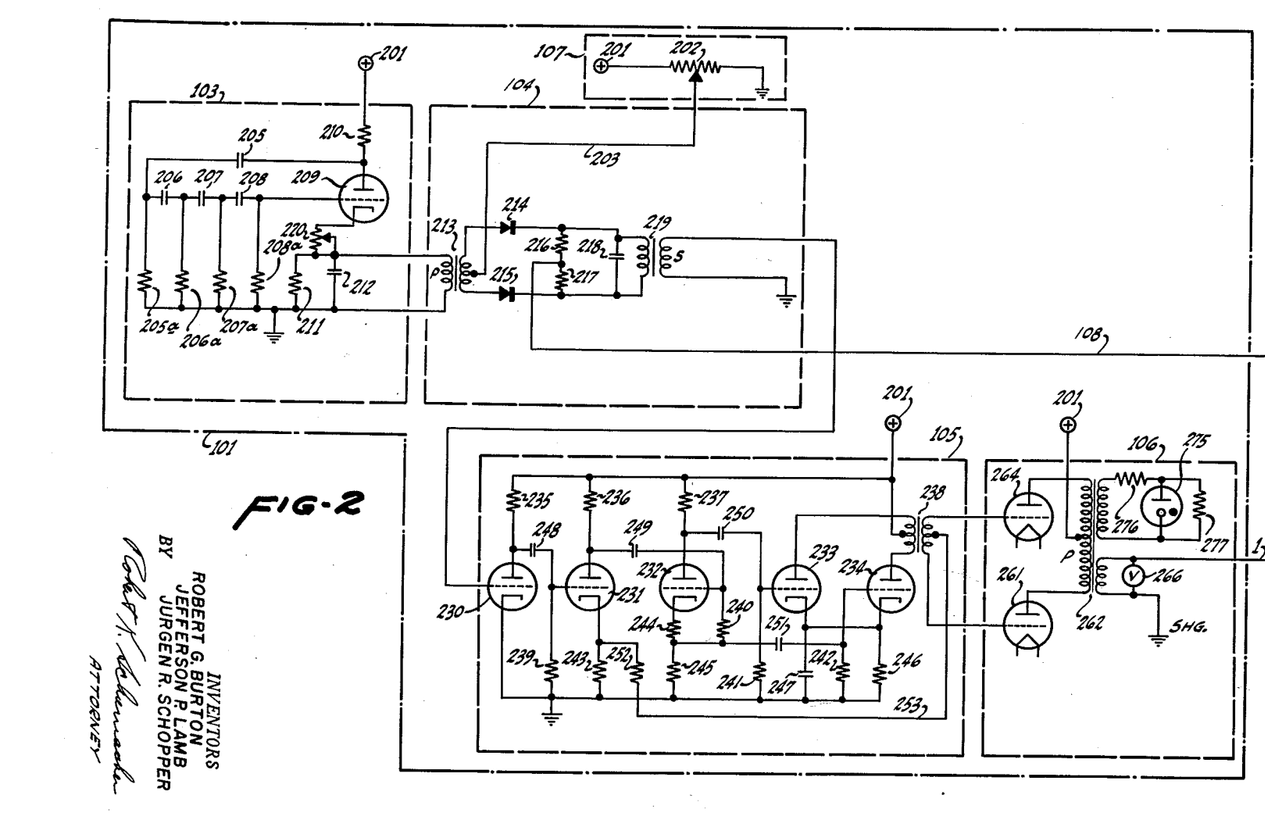
FIGS. 2–4 constitute a detailed schematic of the exemplary focus logging system of FIG. 1.
Figure 3:
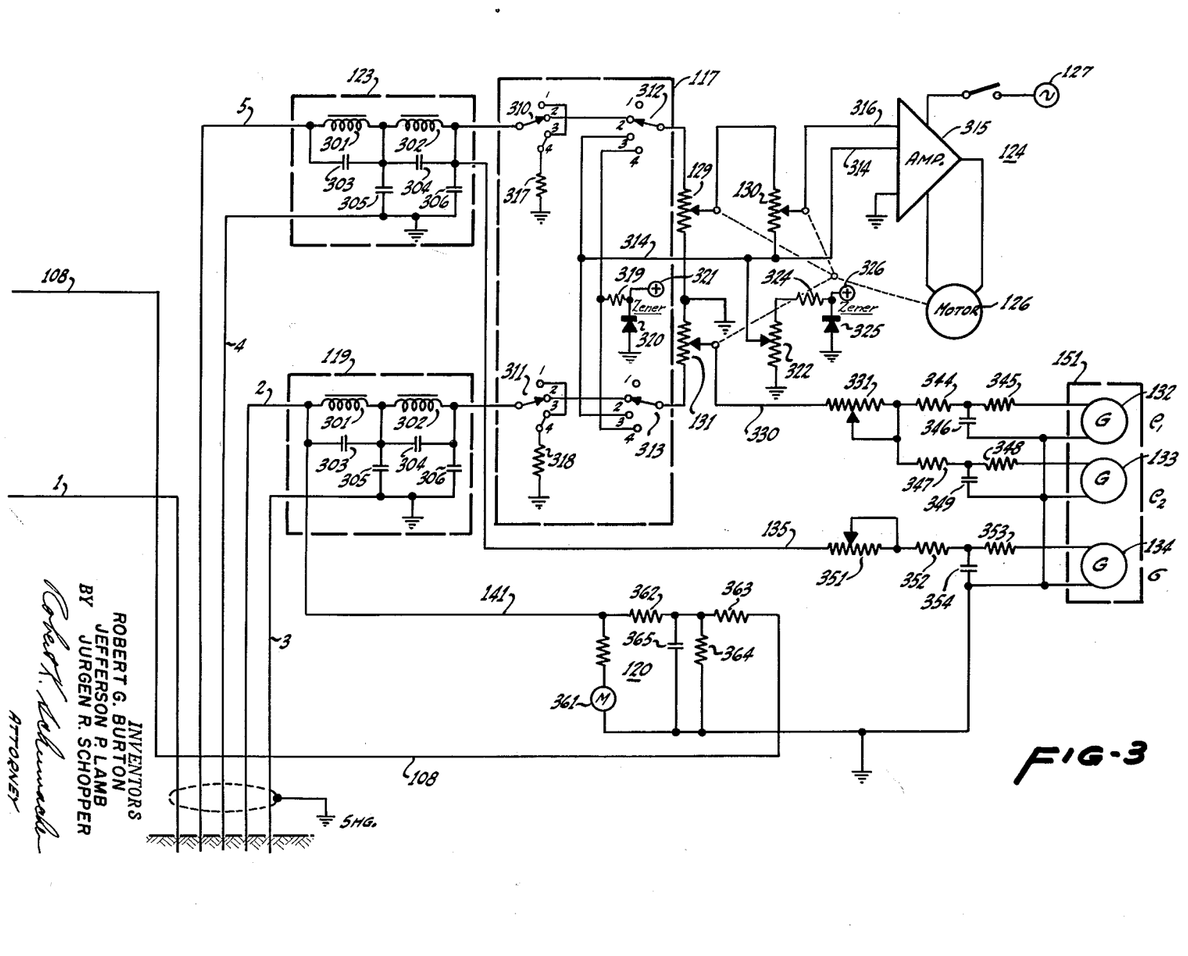
Figure 4:
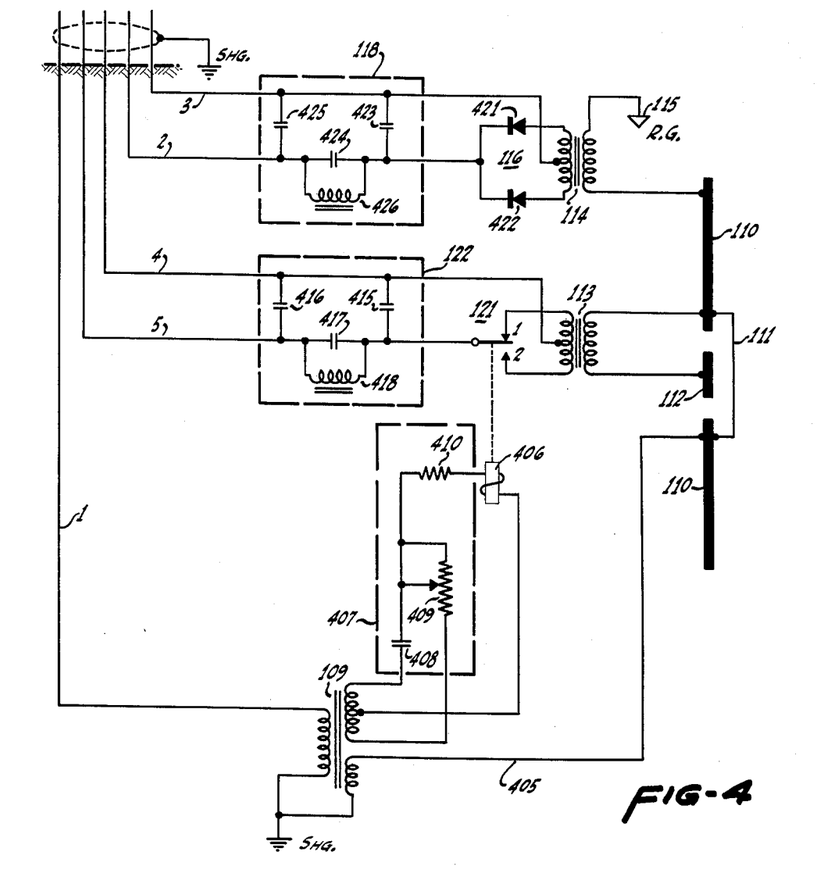
Figure 5:
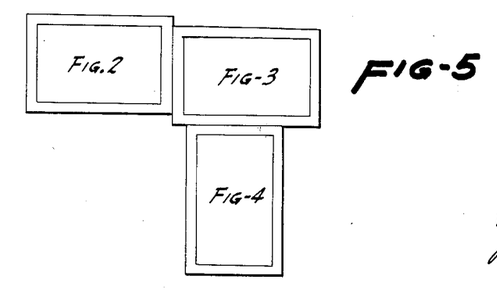
FIG. 5 illustrates the relationship of FIGS. 2–4 to form the detail system of FIG. 1.

Now that the functional block diagram of the focus logging system (FIG. 1) has been examined in some detail, it is appropriate to consider the detailed circuitry in each of the blocks as they are related in the focus logging system. The detailed circuit is schematically represented in FIGS. 2, 3 and 4, arranged in the order suggested by FIG. 5 and, insofar as possible, the blocks identified in FIG. 1 are labeled in a similar manner in FIGS. 2, 3 and 4. Consistently, like conductors, etc. FIG. 1 are given the same numbers in FIGS. 2, 3 and 4. It seems most appropriate to describe the details of the focus logging system by describing the controlled voltage generator 101, the subsurface equipment (illustrated in FIG. 4) and the relationship of these two parts of the system to the surface recording equipment (principally collected in FIG. 3) in this order.

*Controlled Voltage Generator*

As noted previously in discussing the block diagram of the generator 101, it includes an oscillator 103, a regulator 104, a driver section 105, an amplifier 106 and a source of reference potential 107.

Turning to the reference source 107 first, it can be seen to comprise merely a source of well regulated positive D.-C. or B+ voltage 201 cooperating with the voltage divider 202. At this divider, reference potential may be adjusted and taken off over lead 203 for purposes to be explained hereinafter. Beyond the use of a positive source of D.-C. potential 201 with the reference source 107, it is supplied to certain portions of the oscillator 103, the driver 105, and the amplifier 106. Beyond the source of B+, conventional filament current is provided by means not shown to certain tubes in certain ones of these sections.

Turning to the oscillator 103 which is designed to generate an A.-C. signal, it can be seen to be an R-C phase shift type of circuit comprising an input phase shift network including capacitors 205—208 cooperating with resistors 205a—208a, vacuum tube 209, load resistor 210, variable cathode resistor 220, and the resonant cathode R-L-C circuit comprising resistor 211, capacitor 212, and the inductance of the primary winding of transformer 213. The oscillator output is on the cathode side of tube 209 so that the frequency or amplitude output of the oscillator 103 is not varied by load fluctuation as it would be if taken off the plate load resistor 210 in a conventional manner, the latter being in the frequency determining portion of the oscillator circuit. This controlled degeneration type of oscillator provides excellent regulation of the tank circuit, which is needed in the critical application of constant or controlled voltage generation. The cathode R-L-C circuit is tuned to the output A.-C. frequency in the preferred embodiment of the present invention, but of course it could be tuned to a different frequency for a system providing constant voltage at a different frequency. The gain of the oscillator 103 is adjusted by varying resistor 220 in the cathode circuit of tube 209; and the gain is set at a value just above that at which oscillation commences. This results in the best waveform.

The output of the oscillator 103 is connected by transformer 213 to the regulator 104 which is coupled to the input of driver 105. More particularly, the output of oscillator 103 is applied to the grid of the input tube 230 of driver 105 through a part of the regulator circuit 104 which includes transformer 213, similarly poled diodes 214 and 215 in each leg of the output winding of transformer 213, and the primary winding of transformer 219. Serially connected resistors 216 and 217 and capacitor 218 are shunted across the primary winding of transformer 219. Capacitor 218 and the inductive input winding of transformer 219 are tuned to the frequency desired. The operation of the regulator device 104 in providing a controlled voltage output from generator 101 is described in detail hereinafter.

The output of the oscillator 103 at transformer 219 in the regulator circuit 104 is applied to the driver 105 where it is amplified, split through a more or less conventional phase inverter and used to control a low power driver stage. The driver 105 includes triode connected vacuum tubes 230—234. The tubes 230, 231 and 232 are connected to the B+ supply 201 through load resistor 235, 236 and 237, respectively whereas tubes 233 and 234 are connected to respective terminals of the primary side of transformer 238 which is center tapped to the B+ source 201. The grids of tubes 231, 233 and 234 are connected to ground through grid leak resistors 239, 241 and 242, respectively, and grid leak resistor 240 associated with tube 232 is connected to the junction of resistors 244—245. The cathode of input tube 230 is directly grounded while tubes 231 and 232 employ cathode resistors 243 and a series pair 244—245, respectively. The cathodes of tubes 233 and 234 are grounded through resistor 246 which is, in turn, shunted by capacitor 247. Capacitor 248 couples amplifying tubes 230 and 231 and capacitor 249 couples tubes 231 to the phase inverter tube 232. The plate and cathode of the phase inverter are coupled through capacitors 250 and 251, respectively, to the push-pull driver stage formed by tubes 233 and 234.

The oscillator signal, across transformer 219, is amplified in the first stage (tube 230) of the driver 103 and thereafter amplified in the phase inverter in the second stage comprising tubes 231 and 232. The two signals are then used to drive the push-pull output stage including tubes 233 and 234 which places the signal across the input winding of transformer 238. The output of transformer 238 is connected in push-pull to the grids of the tubes 260 and 261 which perform a power amplifying function and in turn place the signal across the primary of transformer 262.

The first output winding of transformer 262 is shunted by gas tube 275 associated with dropping resistors 276 and 277. Neon bulb type gas tube 275 acts as an over voltage indicating device to warn when the voltage across the secondary winding of transformer 262, and hence the output of the generator 101, is excessive. The second output winding of transformer 262 is connected between the current conductor 1 and sheath ground. A voltmeter 266 is connected across the current conductor 1 and sheath ground.

As noted earlier in discussing the functional layout of FIG. 1, the controlled voltage output of voltage generator 101 is sampled at the subsurface equipment across the secondary of transformer 114, rectified and transmitted over conductors 2 and 3 to the surface equipment. This sample, slightly modified, appears between ground and lead 108, previously mentioned, and is connected to the junction of resistors 216 and 217 in the regulator circuit 104. The D.-C. reference potential 107, generated as a result of positive voltage source 201 and dropping resistor 202 is applied to the center tap of the secondary winding of transformer 213 in the regulator circuit 104 via lead 203. The reference potential on lead 203 and the sample potential on lead 108 are applied in opposition in order to operate the variable conductance bridge which regulator circuit 104 includes.

The diodes 214 and 215 of the regulator circuit 104 cooperate with the sample and reference potentials, as supplied at the junction of resistors 216 and 217 and at the center tap of the secondary winding of transformer 213, respectively, to form the variable conductance bridge. The regulator circuit operates in the following manner to maintain constant voltage output between the electrode array and sheath ground (SHG). With the proper voltage output at the secondary winding of transformer 262 in the amplifier section 106 and with the normal resistivity of the subsurface formation constant as determined by the sample applied over lead 108 to the junction of resistors 216 and 217, the bridge is balanced. In this balanced condition, the conductivity of diodes 214 and 215 is such that they permit transfer of exactly the amount of oscillator voltage from transformer 213 to transformer 219 necessary to cause the driver 105 and amplifier 106 to provide the selected output voltage through the secondary of transformer 262.

If the output voltage tends to change due to a change in formation resistivity adjacent the logging tool or due to a change in cable conductor resistance, etc., the sample potential picked off at subsurface transformer 114 similarly changes. This causes an unbalance of the bridge in a direction which changes the conductivity of diodes 214 and 215 to restore balance.

Diodes 214 and 215 become substantially open-circuited when the sample potential exceeds the reference potential. As a result of this characteristic, the transfer of voltage from transformer 213 to transformer 219 decreases to decrease the current flowing in conductors 1 and sheath ground whereby it overcomes or compensates for previously increased formation resistance. Conversely, if the output voltage decreases due to a decrease in the resistivity of the formation adjacent the subsurface tool, the lower voltage sampled across the subsurface transformer 114 causes an opposite unbalance between the reference and sample potentials. This unbalance drives the diodes more conductive which decreases the resistance to current flow therethrough. And, as the resistance of the path between the oscillator 103 and the amplifier section 106 decreases the output current increases thereby to restore balance or to overcome the temporary decrease in resistance.

The control or voltage regulating system described above is automatic and, quite unlike carbon pile and other current regulators, is substantially instantaneous in its action. Further, it is independent of the phase characteristics of the load and not subject to the loop oscillations of usual A.-C. servo systems. The control device or regulator 104, employing the diodes 214 and 215, employs variable conduction devices (which may be, e.g., silicon junction type diodes), in a balanced bridge. This provides not only instantaneous compensation but eliminates distortion which results when single diode control circuits are used.

The operating range of the diodes 214 and 215 is limited to that portion of their characteristics curves lying in the region near the origin of the coordinate axes. This part of the voltage-current curve closely approaches a straight line; thus, by keeping the excursions of the voltage small, the diodes function as parts of a variable conductance bridge rather than as high impedance switches. Accordingly, the electrical values of the regulating circuit and the potentials applied thereto are chosen so as to restrict operation of the diodes to the substantially linear range on their characteristic curves. Naturally, it should be understood that it is the current flowing in the output winding which is varied in order to maintain the proper voltage output.

With the controlled voltage generator 101 explained in detail, and leaving in abeyance the detailed circuitry from which the sampled voltage is obtained, it is next appropriate to consider how this source of controlled voltage is employed by the subsurface equipment when applied to the primary of transformer 109.

*Subsurface Equipment*

The voltage generated and applied between conductor 1 and sheath ground is applied across the primary of transformer 109 (FIG. 4). Transformer 109 has two secondary windings one of which is connected at one terminal to sheath ground (SHG) and at the other terminal over lead 405 to the guard electrodes 110. Transformer 109 has a quite high stepdown ratio and is referred to as a current or subsurface power transformer. Its main purpose is to match the output of the generator 101 and the intervening cable to what appears to be a good average formation impedance. It is chosen in order to provide a maximum power transfer to the formation. Since the path in the borehole between the 100 ft. remote ground electrode and the main electrode array represents a quite low impedance, only a relatively few ohms, it does not vary appreciably from well to well and impedance matching at the subsurface is definitely justified to obtain maximum power transfer. It cannot be done at the surface through the cable conductors because the IR drops would be much too severe and erratic. The primary of transformer 109 has an impedance that permits full power output of the generator despite the intervening line and the secondary is made to match the average formation characteristics. In instances where, for example, the output of the generator may be of the order of 200 volts, the actual formation voltage may be only 1 to 3 volts. The current output of the generator, on the other hand, will vary by around 0.5 ampere at the primary and many, many amperes in the secondary.

The other secondary winding of transformer 109 acts to control the motor of the synchronous rectifier used in connection with the A.C. to D.C. converter 121. The motor part of the A.C.-D.C. converter 121 includes a coil 406 and a phase shift network 407. The center tap of the second secondary winding of transformer 109 is connected to one side of the coil 406 of the synchronous rectifier while the two terminals thereof are connected through the phase shift network 407, which includes capacitor 408, variable resistor 409 and dropping resistor 410, to the other side of the winding of the coil 406. By driving the coil 406 of the converter unit 116 directly from the A.C. source, it automatically synchronizes the alternation of its associated contacts 1 and 2 with the source of constant voltage and provides the synchronous rectification required. The phase shifting network 407 is provided to phase the operation of the contacts 1 and 2 with the signals appearing on the secondary winding of transformer 113 coupling the center electrode 112 to the guard electrodes 110. Once the phase shifting network 407 has been set to do this, the contacts 1 and 2 alternate synchronously with the application of the A.C. power.

The secondary of transformer 113, the primary of which connects the electrodes, is connected at each terminal to contacts 1 and 2 of coil 406, in turn associated with the synchronous rectifier circuit 121, while the center tap of the secondary winding of transformer 113 is connected to conductor 4. The swinger of motor 406, in conjunction with the center tap lead from the secondary of transformer 113, are connected to the input of the low-pass filter 122 and from there to conductors 4 and 5, respectively. Capacitors 415 and 416, and 417 shunted by inductor 418 comprises a M-derived low-pass filter which eliminates ripple components generated by the rectification and also prevents crosstalk between the conductors from backtracking and being randomly chopped by the synchronous rectifier. As noted before, this may result in a larger error signal, if permitted. Thus, at the point where the current signal is applied to conductors 4 and 5 for transmission to the surface equipment, the original alternating current signal has been stepped up into a voltage signal, synchronously rectified, filtered and applied to the conductors as a D.C. voltage signal proportional to the current distribution through the center electrode 112. As noted above, if the voltage between the guards and the remote point is held constant, the current distribution through the center electrode 112 is inversely proportional to the resistivity of the formation opposite the center electrode. Or alternatively, the combination of the center electrode current distribution and the center-guard voltage variation provide conductivity and resistivity measurements for the subsurface lithology. In physically connecting transformer 113 in the configuration described above, it is important to place it as close to the electrodes as possible and use minimum length leads, otherwise stray capacitive coupling and other degrading influences will materially compromise the current signals obtained.

Leaving for the moment the way in which D.C. current signals applied to conductors 4 and 5 are utilized at the surface equipment, consider the voltage detection circuit forming part of the subsurface equipment. The voltage is sampled for transmission to the surface equipment to be used with the D.C. current signals, just described, to obtain the resistivity values of the subsurface formations. As noted previously in discussing the functional schematic of FIG. 1, the voltage is sampled across the secondary of transformer 114, the primary of which is connected between guard electrodes 110 and the remote ground 115. The voltage sampled is applied to the full-wave rectifier 116 and thence connected to the input of an M-derived low-pass filter 118. Thereafter, the D.C. equivalent is applied to conductors 2 and 3 for transmission to the surface equipment. More particularly, the primary of transformer 114 is connected between the elongated guard electrodes 110 and a 100 ft. or so remote ground 115. The voltage signal is sampled between the guard electrode 110 and the remote ground 115 in order to prevent the finite values of cable drop to be added to the sample voltage which would make it inaccurate.

Insofar as the current return for generated voltage is concerned, it is desirable to use the sheath because its length provides a long path of low resistance. This is helpful in the down-hole current circuit but since there is little or no current flow in the sample voltage signal path a low resistance remote is not needed for the potential measurement and the voltage drop in the sheath for the first hundred feet or so due to returning currents could and would affect the accuracy of the sample. Thus, in order to avoid common ground loop problems, the voltage sample and constant voltage circuits though parallel do not employ the same point of return.

An input impedance in the neighborhood of 1000 ohms is used in the primary of transformer 114 to prevent shunting of the mud column or formation by the sample voltage circuit. The terminals of the output winding of transformer 114 are connected through diodes 421 and 422 to one terminal of the input of the low-pass filter 118, while the other terminal of the input to filter 118 is connected to the center tap of the secondary winding of transformer 114.

In the case of the voltage sample, it is unnecessary to use a synchronous rectifier for the simple reason that during the course of logging, the voltage between the guard structure and the remote point does not change drastically. Since the remote point is 100 ft. or so above the subsurface instrument and the voltage measured normally is rather large, 1 to 3 volts, the linearity of rectification is not impaired by the use of diodes as it would be in the case of the current channel previously discussed. In the latter, the signal is never more than a few volts, and more than likely, a few millivolts. Moreover, there is no phasing problem in the voltage channel and the mechanical problems of the synchronous rectifiers do not justify their use. Even so, a synchronous rectifier similar to 121 can be used with good results.

The output of the full-wave rectifier 116 is fed through the low-pass filter 118, which constitutes an M-derived filter including capacitors 423, 424, and 425 and inductor 426 shunting capacitor 424. The purpose of filter 118 is similar to that of filter 122, previously described in connection with the current signal channel. The output of the low-pass filter 118 is applied to conductors 2 and 3 to transmit to the surface equipment a D.C. voltage signal proportional to the A.C. voltage across transformer 114.

*Surface Equipment*

The current signal applied to conductors 4 and 5 for transmission to the surface equipment is connected to the input terminals of low-pass filter 123 (FIG. 3) and the D.C. signal representing the voltage signal is transmitted over conductors 2 and 3 to the input terminals of low-pass filter 119 at the surface equipment. Directing attention to the surface equipment of FIG. 3, it can be seen that the conductors 3 and 4 are grounded at the surface and thereafter the single conductors 5 and 2, associated with the current and voltage signal paths respectively, are fed to identical low-pass filters 123 and 119. Even though the other conductors of the current and voltage signal paths are grounded at the surface, it is necessary to bring the signals up between pairs of signal conductors. For one thing, the sheath does not make a good signal return, especially when the signal being transmitted is a D.C. one. This is due to the spontaneous potentials of the earth which flow in and out of the sheath causing large random drops. Furthermore, a common lead with its resistance of several hundred ohms compared to several tens of kilohms surface termination would cause some interaction into the current channel from the voltage channel with its possibly 1000 times higher level, should a common conductor be utilized for transmission of both signals. Beyond this, a logging cable is a poorly insulated device at best. Even under normal conditions, the insulation resistance drops down to a fraction of a megohm or so when the cable becomes hot and saturated with oils and fluids which normally exist in a borehole. This combined with the fact that the last thousand feet or so is where the principal amount of leakage takes place lead inexorably to the conclusion that leakage between the current signal conductors and the voltage signal conductors would be intolerable, or at least degrade the signals being transmitted to the surface equipment if the paths were converted to a single ended output before transmission to the surface equipment. By using pairs of conductors the differential leakage is not as great as the leakage would be if the signal conductors used common or other sheath grounds. Then too, capacitive coupling between the current conductor and the signal conductors is minimized by using balanced pairs of signal conductors, although the latter is of less importance since the low-pass filters prevalent at both the surface and subsurface locations take care of any A.C. components that leak or are capacitively coupled to the signal conductors. It is the differential leakage between the two current signal conductors and the two voltage signal conductors with respect to the sheath which is undersirable and which is eliminated by using balanced pairs for transmission. Once the signals reach the surface, one of the two conductors of each circuit may be grounded without changing the balanced relationship. Beyond this, it is easier for most electronic equipment to work into a single ended circuit than into push-pull circuits. Thus, using pairs of conductors simplifies the problem of coupling the surface equipment which must be used cooperatively.

The current and voltage signals are connected via respective conductors 5 and 2 to low-pass filters 123 and 119 which are inserted in the transmission path for precisely the same reason as were subsurface filters 118 and 122. However, in the surface case, they are M-derived two stage low-pass filters employing the input capacitance of the cable, rather than finite input capacitors as shown in the subsurface filter circuits 118 and 122. Particularly, each of these filters 119 and 123 includes serially connected inductors 301 and 302 shunted by capacitors 303 and 304 with either side of capacitor 304 connected through capacitors 305 and 306 to circuit ground. The single ended output of filter 123— the current signal transmission path—is connected to the wiper of a four position rotary switch 310 and the single ended output of filter 119—the voltage signal transmission path—is connected to the wiper of a four position rotary switch 311, and both switches are contained in switching means 117. Also included in the switching means 117 are third and fourth rotary switches 312 and 313. Rotary switches 310—313 are supported on a common axis and may be rotated by the same knob, which may be manually or automatically actuated. In the exemplary embodiment of the present invention the rotary switches 310—313 are operated by the operator manually turning the knob. Contact 1 position on each of these rotary switches represents the normally Off position, and position 2 is the setting employed during operation of the focus logging system. Position 3 is employed to set a zero deflection on the servo system 124 and position 4 is employed to obtain a full scale deflection setting for the servo system 124, all of which will be more particularly explained below.

Leaving for the moment the setting of full-scale deflection in the servo system 124 and considering the operation of the surface equipment with the wipers of switches 310—313 set on position 2, the Operate position, it can be seen that the output from the current signal low-pass filter 123 is connected through the position 2 of switch 310 to the same position on switch 312 and from there to one side of the servo null potentiometer 129. The other side of the linear potentiometer 129 is grounded and the wiper thereof is connected to one side of the linear potentiometer 130, the latter being employed to obtain a constant gain ($\alpha$) through the servo system 124. The other terminal of the linear potentiometer 130 is connected to lead 314 which is one input to the differential amplifier 315 of the srvo system 124. Lead 314 is also connected to position 3 of rotary switches 312 and 313. The wiper of the constant gain, linear potentiometer 130 is connected to lead 316 which forms the other input to the differential amplifier 315.

Rotary switch positions 1, 3 and 4 of rotary switch 310 are commoned through a resistor 317 to ground and positions 1, 3 and 4 of switch 311 are commoned through a resistor 318 to ground. Positions 2 on switches 311 and 313 are connected together whereas position 4 on switches 312 and 313 are commoned through resistor 319 to the cathode of a Zener diode 320 and to a positive source 321. The anode of diode 320 is grounded. The Zener diode 320 acts to provide a reference potential of the order of one volt to set full-scale deflection for the servo system 124 when rotary switches 310—313 are all set to position 4 prior to operation. The source of reference potential for the servo system 124 is applied by a potentiometer 322 connected between ground and, via resistor 324, to the cathode of a Zener diode 325 and a positive source 326. The anode of the Zener diode 325 is grounded. With this particular arrangement, by varying the position of the wiper associated with potentiometer 322, a preset reference potential may be obtained since the wiper is connected to lead 314 which is an input to the servo system 124.

Resistors 317 and 318 provide loads representative of the operating load, when rotary switches 310—313 are in positions 3 and 4.

To complete the various interconnections between the switches of switching means 117, the single ended output of low-pass filter 119 in the voltage signal channel is connected to the wiper of switch 311 and the wiper of switch 313 is connected to one side of the readout potentiometer 131, the other side of which is grounded. The wiper on readout potentiometer 131 is connected over lead 330 to one side of sensitivity adjustable resistor 331, the use of which will be described below.

As will be recalled from the general description of the functional circuit of FIG. 1, the motor 126 in response to the output of differential amplifier 315 (amplifier 125 in FIG. 1) in the servo system 124 rotates the wipers on the potentiometers 129, 130 and 131. In operation, the D.C. current signal between conductors 4 and 5 is filtered by filter 123 and converted to a single-ended output that is fed through the wiper of switch 310 (position 2) and the wiper of switch 312 to one side of the servo null potentiometer 129. From there the incoming current signal is fed through the taps of potentiometers 129 and 130, over lead 316 to the servo system 124. The reference potential from 322 is the other input to the amplifier 315 and is obtained as described above.

The purpose of the servo motor 126 is to produce a shaft rotation inversely proportional to the amplitude of the incoming current signals. The servo null potentiometer 129 has as its sole purpose to null the servo system after the correct shaft rotation, inversely proportional to a given incoming current signal is obtained. Thus, whenever the current flowing in conductors 4 and 5, through the low-pass filter 123, the switching means 117, potentiometers 129 and 130, and over lead 316 to the servo system 124 has caused the shaft of the motor 126 to rotate an inversely proportional amount, the servo null potentiometer 129 returns the servo input to zero, i.e., when the signal between leads 314 and 316 is reduced to zero.

The purpose of potentiometer 130 is to maintain constant loop gain in the servo system.

The signal picked off of the readout potentiometer 131 and directed over lead 330 to the recording means acts to provide a galvanometer deflection equal to the product of the reference voltage and the voltage signal divided by the current signal. Thus, by maintaining the reference and signal voltages constant, the galvanometer deflection will vary inversely proportional to the current signal, which is as it should be.

After the incoming current signal on conductor 5 has been fed through the surface equipment to the input of the amplifier 315 where it is compared by the amplifier with the reference input on lead 314 and the motor 126 has rotated a proportionate amount, the potential at the wiper of potentiometer 131 is applied to the galvanometers 132 and 133 which are part of the recorder 151. However, before considering how this potential is applied to the galvanometers 132 and 133 it is necessary to trace the energy source for potentiometer 131. This is obtained from the D.C. voltage signal transmitted to surface equipment over conductors 2 and 3 as mentioned earlier. The conductor 3 is connected to the circuit ground to obtain a single-ended output from the low-pass filter 119, as previously described. After traversing this filter, the voltage signal is applied to the wiper of switch 311 and, in the operate position 2, connected through to the wiper of switch 313. From there it is connected to one side of the linear potentiometer 131, the other terminal of which is grounded. The wiper of this potentiometer 131 is driven by the shaft of motor 126, as noted before.

With this arrangement the readout potential is picked off of the potentiometer 131 by the wiper connected to lead 330 and fed through an adjustable resistor 331 which permits the sensitivity of the galvanometer 132 to be set. After coursing the adjustable potentiometer 331, the signal is fed through a low-pass filter including serially connected resistors 344 and 345 with a capacitor 346 connected between their common terminal and circuit ground. The non-common terminal of resistor 345 is connected to the galvanometer 132 and the other terminal of the galvanometer 132 is grounded. The adjustable potentiometer 331 is also connected through another low-pass filter including resistors 347 and 348, in turn connected at their common point through a capacitor 349 to ground. The input to galvanometer 133 is from the resistor 348.

The adjustable potentiometer 331 sets the basic sensitivity for the galvanometers 132 and 133, and the low-pass filter including resistors 344 and 345 and capacitor 346 is designed to remove extraneous A.C. components from the first beam galvanometer 132. In a similar manner, the low-pass filter consisting of resistors 347, 348 and capacitor 349 is designed to remove extraneous A.C. components from the second beam galvanometer 133. Beyond this, the resistor 347 is selected to properly set the sensitivity of the galvanometer 133 for the second beam deflection. With this arrangement, the wiper of the servo driven potentiometer 131 selects a part of the voltage signal appearing across conductors 2 and 3 and places it on lead 330 for transmission to the first and second beam galvanometers 132 and 133, respectively, to provide resistivity measurements of the subsurface formations adjacent the electrode array.

Looking more particularly at how the servo system 124 operates to provide these output resistivities at galvanometers 132 and 133, suppose that a high current signal corresponding to a low resistivity formation is detected. This signal is fed to the servo amplifier 315 which in turn rotates the motor 126. This simultaneously causes the potentiometers 129 and 130 and 131 to rotate clockwise. As potentiometers 129 and 130 rotate, the input signal to the servo amplifier 315 approaches the same value as the reference voltage appearing on lead 314. Once this occurs, the servo system is nulled between the two inputs since the differential is now zero input across terminals 314 and 316. The motor 126 comes to rest in this position corresponding to this incoming signal amplitude, and, if the incoming current signal was an extremely large one, then the potentiometers 129, 130 and 131 will have rotated substantially a complete revolution in a clockwise direction. As can be noted from examining the potentiometer 131, this rotation in a clockwise direction results in dividing down the voltage signal appreciably, and thus corresponds to an extremely low resistivity signal. The low signal is fed to the pair of galvanometers 132 and 133, as previously described.

On the other hand, if the incoming current signal on conductors 4 and 5 is quite small, the potentiometers 129, 130 and 131 will be rotated in a counter-clockwise direction until a point is reached where the input to the servo on lead 316 equals the reference signal appearing on lead 314. At this time the servo system is nulled, the motor 126 stopped, and the potentiometer 131 will have traveled an appreciable distance in a counter-clockwise direction. This results in feeding a large proportion of the voltage signal across conductors 2 and 3 to the resistivity galvanometers 132 and 133.

Turning to the conductivity measurement for the focus logging system heretofore described, it will be remembered that since the voltage is maintained constant at the subsurface tool, the current signal flowing in conductors 4 and 5 gives a direct measurement of the conductivity of the formation adjacent the center electrode 112 in the subsurface area. Thus, the single-ended output of the low pass filter 123 is fed over lead 135 to a galvanometer circuit which records the conductivity of the formations.

The lead 135 is connected to one side of a conductivity base scale setting potentiometer 351, the other side of which is connected to a low-pass filter including resistors 352, 353 and a capacitor 354. This is an RC low-pass filter providing the same filtering action as the ones described in connection with the resistivity channels terminating in galvanometers 132 and 133. By varying the potentiometer 351, however, the base scale of the conductivity channel may be set to provide a full-scale output for galvanometer 134. In this particular arrangement the current detected at the output of low-pass filter 123 is fed over lead 135, through adjustable potentiometer 351 to the galvanometer 134 which measures directly the conductivity of the subsurface formation. Naturally, the fact that the conductivity is directly proportional to the current signal points up the principal reason for maintaining the voltage constant at the subsurface electrode array. If this were not done to obtain conductivities, it would be necessary to use another servo system in which the conductivity was a ratio function of current and voltage. By regulating the voltage at the subsurface, it not only avoids an additional servo system but does not make the servo mechanism associated with the resistivity curves work as hard. That is, the existing servo system 124 does not have to have as great a dynamic range. Consideration of the relationship, previously referred to, wherein a resistivity galvanometer deflection is equal to the product of the reference and signal voltages divided by the current signal makes this obvious. If both the voltage signal and the current signal are varied, it is conceivable that under some formation conditions the voltage signal might rise and the current signal might fall and the servo would have to cover the extremely wide dynamic range. If one is fixed, only the other would vary and the total excursion of the system would be generally less. This happens quite often in actual practice and, as a result, constant voltage focus logging system is desirable.

Turning now to the remaining unexplained part of the focus logging system, it will be remembered that in the functioning of the constant voltage control system the subsurface sample of the voltage was obtained and transmitted ultimately over lead 108 to the variable conductance bridge in the regulator circuit 104 of the voltage generator 101. While this was assumed at the time, the detailed surface circuitry was not discussed. Looking particularly at the surface equipment illustrated in FIG. 3, it can be seen that the voltage signal is sampled over lead 141 at the input to the low-pass filter 119 and directed to the sample meter filter circuit 120, previously mentioned. Circuit 120 includes a meter 361 serially connected between lead 141 and circuit ground. The circuit 120 also comprises a low-pass filter including serially connected resistors 362 and 363 with a capacitor 365 connected to the common junction of resistors 362 and 363 at one set of terminals and to ground at their other terminals. This low-pass filter acts as does filter 119 to eliminate any A.C. ripple, crosstalk, and the like, from the sample voltage signal applied over lead 108 to the variable conductance bridge of the regulator circuit 104.

In view of the foregoing detailed description of the exemplary focus logging system comprising the present invention, it is perhaps well to reconsider the functional relationship of the components in the system. As will be remembered from the description of the functional diagram of FIG. 1, a source of controlled voltage is applied between one conductor and sheath ground to the electrode configuration consisting of two guard electrodes and a center electrode. The oppositely disposed guard electrodes are connected together and the center electrode connected thereto through the low impedance primary winding of a transformer. The current signal is taken off the secondary of this transformer, rectified, filtered and supplied to the surface equipment over a pair of conductors as representative of the current emanating from the center electrode. At the same time, the voltage at the subsurface instrument adjacent the electrodes is sampled between the guards and a remote ground, converted to D.C., filtered and supplied to the surface equipment over another pair of conductors. At the surface the current and voltage signals are converted into single-ended outputs, further filtered and supplied to the switching means. The voltage signal is there applied to a readout potentiometer of the servo system and through the sample meter filter circuit to the variable conductance bridge in the voltage generator. The latter provides the reference for maintaining the voltage constant at the electrode array. The current signal, on the other hand, is fed through the switching means to cooperate with two other servo system potentiometers which cause the servo motor to rotate. The proper amplitude voltage signals from the readout potentiometer part is selected, therefore, for application to the resistivity galvanometers. The current signal is more directly applied to a conductivity galvanometer. By this arrangement, the current flowing out of the center electrode is measured to obtain the conductivity of the subsurface formation since the subsurface voltage is maintained constant, and the resistivity value is obtained by reciprocating the conductivity. This particular arrangement provides a relatively straightforward and simple system for focusing the current into the formation to obtain thin bed definition. The system has the advantage of employing no subsurface vacuum tubes or the like and relatively simple surface equipment.

While the present invention is illustrated with respect to a specific focus logging system, it should be apparent to those skilled in the art that numerous other modifications and variations may be made without departing from the spirit and scope of the present invention. To this end the present invention should be in no wise limited except by the appended claims.

What is claimed is:

1. In a focus logging system for obtaining information on the subsurface lithology adjacent a bore hole, the combination of surface equipment including a source of alternating potential, a subsurface logging tool, a plurality of conductors interconnecting said logging tool and said surface equipment, and means for moving said logging tool along the extent of the bore hole; said logging tool comprising a main electrode, a focusing electrode array disposed in spaced relation to said main electrode and insulated therefrom, means cooperating with selected ones of said conductors and said electrodes and with said source of alternating potential to establish an electrical field in the formation adjacent said logging tool, means to establish a minimal potential difference between said main electrode and said array and to sample the current from said main electrode, means to sample the potential of said established field, means to convert said samples to D.-C. equivalents and transmit said equivalent signals to said surface equipment; and, said surface equipment comprising means responsive to said equivalent potential sample to maintain said field potential substantially constant and recording means responsive to selected instant simultaneous values of said equivalent current and potential samples to provide indications of formation conductivity and resistivity respectively.

2. In a focus logging system for obtaining information on the subsurface lithology adjacent a bore hole, the combination of surface equipment including a source of alternating potential, a subsurface logging tool, a plurality of conductors interconnecting said logging tool and said surface equipment, and means for moving said logging tool along the extent of the bore hole, said logging tool comprising a main electrode, a focusing electrode array including at least one electrode disposed in spaced relation to said main electrode and insulated therefrom, means including a transformer cooperating with selected ones of said conductors and said electrodes and with said source of alternating potential to establish an electrical field in the formation adjacent said logging tool, first transformer means to establish a minimal potential difference between said main electrode and said array and to sample the current establishing said field, second transformer means to sample the potential of said established field, means to convert said samples to their D.-C. equivalents and independent means cooperating with unique pairs of said conductors to transmit said subsurface samples to said surface equipment; and, said surface equipment comprising filtering means to convert said potential and current samples to single ended outputs, means responsive to said potential sample to maintain said field potential substantially constant, and recording means including a servo system responsive to selected instant simultaneous values of said current and potential samples to provide indications of formation conductivity and resistivity respectively.

3. An electrical logging system for obtaining lithological information on formations surrounding a bore hole comprising, in combination, an electrode assembly movable along the extent of the bore hole and including a cylindrically formed exploring electrode and a pair of elongated guard electrodes disposed above and below said exploring electrode, a source of alternating potential located at the surface, means to connect said source with said electrode assembly, means disposed adjacent said electrode assembly to maintain said electrodes at substantially equal potentials and to permit current flowing from said exploring electrode to be sampled, means connected between said electrode assembly and an independent ground to sample subsurface the potential of said assembly, means for transmitting said current and potential samples to the surface, surface means responsive to said current sample circuit to record the conductivity of formations adjacent an instant position of said electrode assembly and further responsive to said sample potential circuit to control said source of alternating potential to maintain the potential of said electrode assembly substantially constant and to cooperate with said conductivity measuring circuit to provide a signal proportional to the resistivity of the formation adjacent said instant position.

4. An electrical logging system for obtaining lithological information on formations surrounding a bore hole comprising, in combination, an electrode assembly including a cylindrical main electrode and a pair of elongated guard electrodes disposed above and below said main electrode, a source of alternating potential, means to connect said source to said electrode assembly with a maximum transfer of power, transformer means disposed immediately adjacent said electrode assembly to maintain said electrodes at substantially equal potentials and to permit current flowing from said main electrode to be sampled, means connected between said electrode assembly and a ground remote therefrom to sample subsurface the potential of said assembly, means for transmitting said current and potential samples to the surface over independent circuits, surface means cooperating with said current sample circuit to record the conductivity of formations adjacent an instant position of said electrode assembly, means utilizing said sample potential to control said source of alternating potential to maintain the potential of said electrode assembly substantially constant, and means responsive to said sample potential to cooperate with said conductivity recording means to record a signal proportional to the resistivity of the formation adjacent said instant position.

5. An electrical logging system for obtaining lithological information on formations surrounding a bore hole comprising, in combination, an electrode array having a main electrode and a focusing array, which focusing array includes at least one electrode supported adjacent and insulated from said main electrode and which acts as a relatively long guard electrode irrespective of its interconfiguration, a source of substantially constant alternating potential, first transformer means supported adjacent said focusing array to couple said source to said focusing array, second transformer means interconnecting said main electrode and said focusing array to maintain said electrode array at substantially the same potential and to permit current flowing from said main electrode to be sampled, third transformer means connected between said electrode array and a ground relatively remote therefrom to sample the potential of said electrode array adjacent the subsurface equipment, subsurface means cooperating with said current and potential samples to filter and convert said samples to D.-C. equivalents for transmission to the surface over independent circuits, surface recording means including a galvanometer cooperating with said current sampling circuit to record the conductivity of formations adjacent an instant position of said electrode array, and means including a servo system and a plurality of potentiometers controlled thereby to reciprocate said conductivity values to provide a signal proportional to the resistivity of the formation adjacent said instant position of said electrode array.

6. An electrical logging system for obtaining lithological information on formations surrounding a bore hole comprising, in combination, an electrode array having a main electrode and at least one focusing array, which focusing array includes at least one electrode supported vertically adjacent and insulated from said main electrode and which acts as a relative long electrode irrespective of its interconfiguration, a source of alternating potential, means including a first transformer supported adjacent said focusing array to efficiently couple said source to said focusing array, a second transformer having a low primary impedance supported immediately adjacent said electrode array, the primary winding of said second transformer connected between said main electrode and said focusing array to maintain said electrode array at substantially the same potential, means including said second transformer to sample the current flowing from said main electrode into said formation, a third transformer connected between said focus array and a remote ground located above and relatively remote from said subsurface electrode array to sample the potential of said electrode array, subsurface means cooperating with said current and potential samples to convert said samples to D.-C. equivalents for transmission to the surface over independent circuits, means responsive to the D.-C. equivalent of said sample potential to maintain the potential of the electrode array substantially constant, surface recording means including a galvanometer cooperating with said current sample circuit to record the conductivity of the formation adjacent an instant position of said electrode array, and a servo system having a plurality of potentiometers driven by the servo motor, said potentiometers cooperating with said sample potentials to provide signals proportional to the resistivity of the formation adjacent instant positions of said electrode array, said recording means including means responsive to said signals to record the resistivity of the formation adjacent said instant position.

7. An electrical logging system for obtaining lithological information on formations surrounding a bore hole comprising, in combination, a relatively short center electrode, a pair of directly connected elongated guard electrodes disposed above and below said center electrode and insulated therefrom, a source of alternating potential, means including a first transformer supported adjcent said guard electrodes to couple said source to said guard electrodes with a maximum transfer of power thereby to establish an electric field in the formation adjacent thereto, a second transformer having a low primary impedance and a high impedance transformation supported in immediate juxtaposition to said electrodes, said primary winding connected between said main electrode and said guard electrodes to maintain said electrodes at substantially the same potentials, means including the secondary of said second transformer to sample the current flowing from said main electrode into said formation, a third transformer having a primary impedance high enough to prevent shunting the mud column and formations defined by the bore hole, the primary winding of said third transformer connected between said guard electrodes and remote from the subsurface equipment including said electrodes, means including the secondary winding of said third transformer to sample subsurface the potential of said electrodes, subsurface means cooperating with said current and potential samples to convert said samples to D.-C. equivalents for transmission to the surface over independent circuits, means for filtering said D.-C. equivalent signals and converting them to single ended outputs at the surface, means responsive to the D.-C. equivalent of said sample potential to maintain the potential of said electrode array, substantially constant, means to move said electrodes and related circuits along the extent of the bore hole, and surface recording means including a plurality of galvanometer circuits, means cooperating with one of said galvanometer circuits and said current sample circuit to record the conductivity of the formation adjacent an instant position of said electrodes, a servo system having a plurality of linear potentiometers driven by the shaft of the servo motor, one of said potentiometers cooperating with the D.-C. equivalent of said sample potential to provide a sample voltage divider and other potentiometers responsive to the D.-C. equivalent of said sample current to rotate said shaft to select a part of said sample voltage proportional to the resistivity of the formation adjacent said instant position, and means including at least another one of said galvanometer circuits responsive to said selected part of said sample voltage divider to record the resistivity of the formation adjacent said instant position.

References Cited in the file of this patent
UNITED STATES PATENTS

| | | |
|---|---|---|
| 2,617,852 | Waters | Nov. 11, 1952 |
| 2,707,768 | Owen | May 3, 1955 |
| 2,714,309 | Redemske | Aug. 2, 1955 |
| 2,726,365 | Bilderback | Dec. 6, 1955 |
| 2,803,796 | Schuster | Aug. 20, 1957 |
| 2,884,590 | Welz | Apr. 28, 1959 |
| 2,967,272 | Janssen | Jan. 3, 1961 |